United States Patent
Tsirkin

(10) Patent No.: US 9,639,393 B2
(45) Date of Patent: May 2, 2017

(54) VIRTUAL PROCESSOR STATE MANAGEMENT BASED ON TIME VALUES

(71) Applicant: Red Hat Israel, Ltd., Ra'anana (IL)

(72) Inventor: Michael Tsirkin, Raanana (IL)

(73) Assignee: Red Hat Isreal, Ltd., Ra'Anana (IL)

( * ) Notice: Subject to any disclaimer, the term of this patent is extended or adjusted under 35 U.S.C. 154(b) by 332 days.

(21) Appl. No.: 14/282,660

(22) Filed: May 20, 2014

(65) Prior Publication Data

US 2015/0339155 A1 Nov. 26, 2015

(51) Int. Cl.
  *G06F 13/24* (2006.01)
  *G06F 1/00* (2006.01)
  *G06F 9/48* (2006.01)
  *G06F 9/455* (2006.01)
  *G06F 1/32* (2006.01)

(52) U.S. Cl.
  CPC .......... *G06F 9/4837* (2013.01); *G06F 1/3203* (2013.01); *G06F 9/45558* (2013.01); *G06F 9/48* (2013.01); *G06F 13/24* (2013.01); *G06F 2009/45575* (2013.01)

(58) Field of Classification Search
  USPC .......................... 710/260–269; 713/300–340
  See application file for complete search history.

(56) References Cited

U.S. PATENT DOCUMENTS

| | | | |
|---|---|---|---|
| 8,490,089 B2* | 7/2013 | Friebel | G06F 9/45541 713/400 |
| 8,775,590 B2* | 7/2014 | Devarakonda | H04L 43/0817 709/223 |
| 2012/0102492 A1* | 4/2012 | Iwata | G06F 9/45533 718/1 |
| 2014/0317392 A1* | 10/2014 | Kawano | G06F 9/4406 713/2 |

* cited by examiner

*Primary Examiner* — Raymond Phan
(74) *Attorney, Agent, or Firm* — Haynes and Boone, LLP

(57) ABSTRACT

A method includes, with a hypervisor, detecting that a virtual processor of a virtual machine has accessed a designated address, the designated address being associated with a time value, causing the virtual processor to enter a halt state for a period of time, and causing the virtual processor to exit the halt state after a period of time has passed, the period of time being based on the time value.

20 Claims, 4 Drawing Sheets

VIRTUAL PROCESSOR STATE MANAGEMENT BASED ON TIME VALUES

BACKGROUND

The present disclosure relates generally to virtual systems, and more particularly, to virtual processor management.

A virtual machine is a piece of software that, when executed on appropriate hardware, creates an environment allowing the virtualization of an actual physical computer system. Each virtual machine may function as a self-contained platform, running its own operating system (OS) and software applications (processes).

A host machine (e.g., computer or server) is typically enabled to simultaneously run one or more virtual machines, where each virtual machine may be used by a local or remote client. The host machine allocates a certain amount of the host's resources to each of the virtual machines. Each virtual machine may use the allocated resources to execute applications, including operating systems known as guest operating systems.

A hypervisor virtualizes the underlying hardware of the host machine or emulates hardware devices, making the use of the virtual machine transparent to the guest operating system or the remote client that uses the virtual machine. Typically, a hypervisor manages allocation and virtualization of computer resources such as processor resources. A physical processor generally may be in one of many sleep states as defined by the Advanced Configuration and Power Interface (ACPI) specification. The ACPI specification is an open standard for device configuration and power management by an operating system. The ACPI defines various C states for a processor. For example, C0 is the operating state, C1 is a halt state that can be readily exited, returning the processor to the operating state. The ACPI defines further C states, C2, C3, etc. that define deeper processor sleep states.

A hypervisor does not allow a virtual machine to control the sleep state of the physical processor. Thus, the hypervisor only reports a single C state to the virtual machine. But, this can lead to inefficiencies when managing multiple virtual machines. For example, a virtual processor may be waiting on an event before executing further instructions. During this wait time, the virtual processor does not need to be utilizing the physical resources of the host machine. It is desirable to have more flexibility with sleep states of a virtual processor.

SUMMARY

According to one example, a method includes, with a hypervisor, detecting that a virtual processor of a virtual machine has accessed a designated address, the designated address being associated with a time value, causing the virtual processor to enter a halt state for a period of time based on the time value, and causing the virtual processor to exit the halt state after the period of time has passed.

According to one example, a method includes, with a virtual machine, determining that a virtual processor of the virtual machine expects to wait for a first period of time for an event, looking up an address in a table that maps time values to addresses, the address corresponding to a time value associated with the first period of time. The method further includes accessing the address from the table, and with the virtual processor, entering a halt state for a second period of time in response to a command from a hypervisor, the second period of time being associated with the time value, the hypervisor running the virtual machine.

According to one example, a computing system includes a processor and a memory comprising computer readable instructions that when executed by the processor, cause the system to run a hypervisor to host a virtual machine, detect that a virtual processor of the virtual machine has accessed a designated address, the designated address being associated with a time value, halt the virtual processor for a period of time based on the time value, and continue execution of the virtual processor after the period of time has passed.

Figure 1:
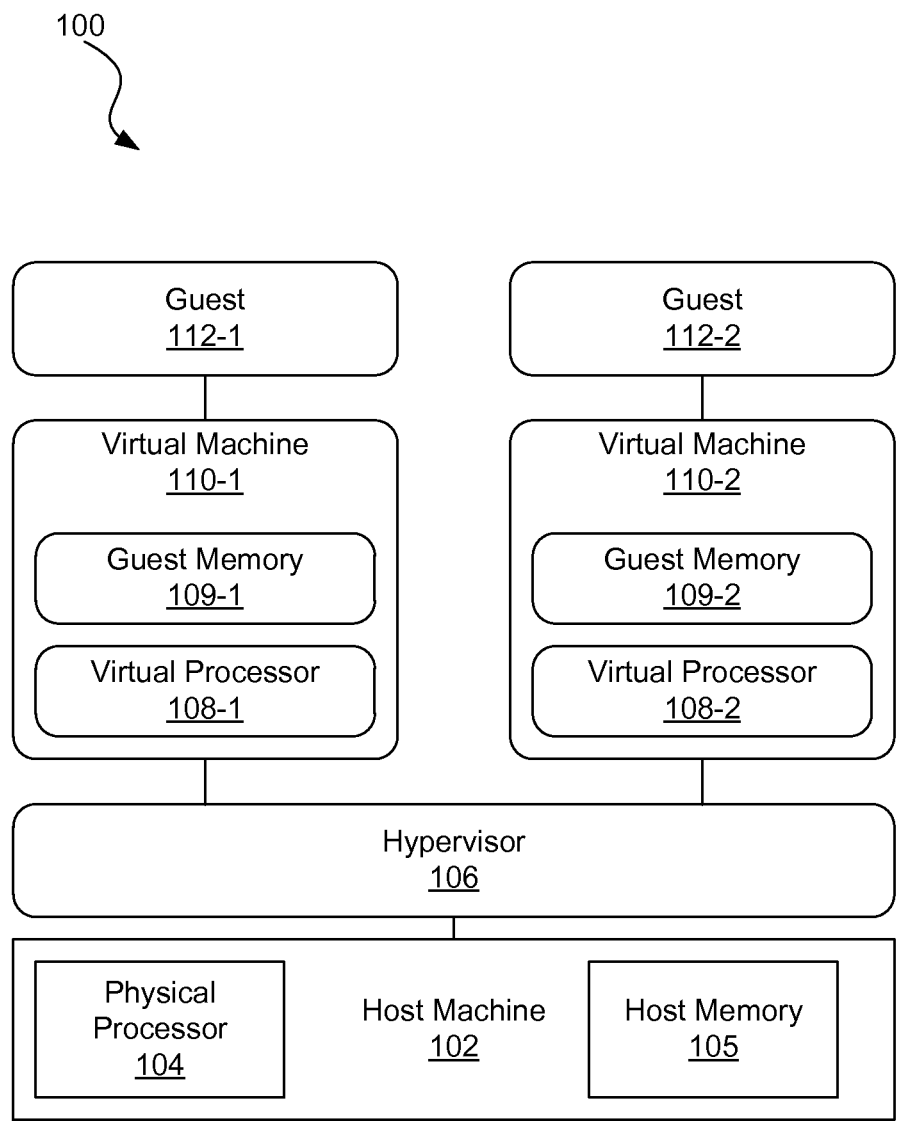
FIG. 1 is a diagram showing an illustrative host system running a plurality of virtual machines, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and spirit of this disclosure. In addition, to avoid unnecessary repetition, one or more features shown and described in association with one embodiment may be incorporated into other embodiments unless specifically described otherwise or if the one or more features would make an embodiment non-functional.

As described above, a virtual processor may be waiting on a processor event before executing further instructions. During this wait time, the virtual processor does not need to be utilizing the physical resources of the host machine. It is desirable to allow the hypervisor to switch to the context of a different virtual machine or into the context of the hypervisor itself while the virtual processor of the virtual machine is waiting on an event.

According to principles described herein, if the virtual machine is waiting on an event that it expects to occur after a specific amount of time, the virtual machine can inform the hypervisor that it can wait for that specific amount of time. This is done by accessing a specific port, such as an Input/Output (I/O) address or a memory address associated with the host machine. The port is monitored by the hypervisor. Additionally, the port is associated with a specific amount of time. When the virtual machine accesses the port, the hypervisor knows that the virtual machine does not expect to execute any instructions for the specific period of time because it may be waiting on an event. Thus, the hypervisor may put the virtual processor into a sleep state, or halt state for the specific period of time. If appropriate, the hypervisor may switch to a different context and switch back to the context of the virtual machine before the virtual processor is to exit the sleep state.

In some examples, the address associated with a specific amount of time may be part of a table. For example, there may be a set of memory addresses, each memory address corresponding to a different amount of time for which the virtual processor can be put into a halt state. For example, if the virtual processor expects to wait for an event for 20 microseconds, the virtual processor may access a memory address associated with 10 microseconds. Alternatively, if the virtual processor expects to wait for an event for 80 microseconds, then the virtual processor may access a different memory address within the table, the different memory address being associated with 70 microseconds.

Thus, by accessing a specific address, the virtual machine can let the hypervisor know that it does not expect an event for a specific amount of time, and the hypervisor can essentially put the virtual processor into a "halt" state or "sleep" state for less than that period of time. The hypervisor can then "awaken" the virtual processor before the virtual processor expects the event upon which it is waiting. This allows for a more efficient system for managing multiple virtual machines.

FIG. 1 is a diagram showing an illustrative host system running a plurality of virtual machines. According to the present example, a physical system, such as a host machine 102 includes hardware such as a processor 104 and a memory 105. The system 100 includes a hypervisor 106. The hypervisor 106 supports a first virtual machine 110-1 with a first virtual processor 108-1 and a second virtual machine 110-2 with a second virtual processor 108-2. Although two virtual machines 110 are illustrated, other examples including fewer than two virtual machines or more than two virtual machines are within the scope of the present disclosure.

The hypervisor 106 may allow multiple operating systems referred to as guests 112, one associated with each virtual machine 110, to run on the same physical system by offering virtualized hardware to the guests 112. Each guest 112 has its own state information. Additionally, the host machine 102 may run multiple guests 112, concurrently and in isolation from other programs on a single system. A guest 112 may run a different operating system than another guest 112 executing on the same host machine. Additionally, the guest 112 running on a virtual machine may also be different from the host operating system running on the host machine 102.

The host memory 105 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software and data.

The host machine also includes a processor 104 for executing software (e.g., machine readable instructions) and using or updating data stored in memory 105. The software may include an operating system, the hypervisor 106 and various other software applications. The processor 104 may represent one or more processors acting in concert.

One or more guests 112 may be run on top of the hypervisor 106. In the example illustrated in FIG. 1, virtual machines 110 are platforms on which the guests 112 run. The hypervisor 106 manages the real system resources and makes them available to one or more guests 112 that alternately execute on the same hardware. The hypervisor 106 manages hardware resources and arbitrates requests of the multiple guests. In an example, the hypervisor 106 presents a virtual set of CPU, memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

The hypervisor 106 can map a virtual resource or state (e.g., registers, memory, or files) to real resources in the underlying host machine 102. For example, the hypervisor 106 may present a guest memory to guest 112-1 and may also present a different guest memory to guest 112-2. The hypervisor 106 may map the memory locations of guest memory to physical memory locations of memory 105.

Additionally, the hardware resources are shared among the hypervisor 106 and one or more guests. A virtual machine exit marks the point at which a transition is made between the virtual machine currently running and the hypervisor, which takes over control for a particular reason. The virtual machine exit may be referred to as an exit of a virtual machine mode of a guest or exit of guest 112. During an exit, the processor 104 may save a snapshot of the state of the virtual machine that was running at the time of exit. The virtual machine exit is handled by the hypervisor 106, which decides the appropriate action to take and then transfers control back to the virtual machine via a virtual machine entry. A virtual machine entry marks the point at which a transition is made between the hypervisor and a virtual machine, which takes over control. If a hypervisor has entered a virtual machine 110, the hypervisor is within the context of that virtual machine 110. If the hypervisor has not entered any virtual machine, the hypervisor 106 is within the context of itself.

According to one example of principles described herein, the hypervisor 106 is within the context of the first virtual machine 110-1. The first virtual machine 110-1 may determine that the first virtual processor 108-1 is waiting on an event and does not expect that event to occur for a specific period of time. In this example, the first virtual machine 110-1 does not expect the event for 50 microseconds. To allow for more efficient utilization of computing resources, it is desirable to put the virtual processor into a virtual halt state or sleep state during that period of time. Additionally, it is desirable to "awaken," or take the halted virtual processor out of the halt state before 50 microseconds have passed.

According to the present example, the virtual machine 110-1 accesses a specific port. In this example, the port is a memory address within the host memory 105. For example, the virtual machine may access a memory address within guest memory 109-1 that is mapped to a memory address within the host memory. In one example, the specific memory address is accessed by overwriting the value stored at that memory address. The specific memory address may also be associated with a specific period of time for which the virtual processor 108-1 is to go into a halt state. For example, the specific memory address may be associated with a halt state having a length of 40 microseconds.

The hypervisor 106 detects that the virtual machine 110-1 has accessed that specific memory address. The hypervisor 106 can then halt the virtual processor 108-1 for the appropriate amount of time, in this case, 40 microseconds. Before halting the virtual processor 108-1, the hypervisor 106 can ensure that there are pending no requests, such as Interrupt Requests (IRQs) pending for the processor. An IRQ is a signal that requests that the processor stop execution of a current program, and run a different program instead.

While the virtual processor 108-1 is in a halt state, the hypervisor has a number of options. In one example, the hypervisor 106 may remain in the context of the first virtual machine 110-1. In one example, the hypervisor 106 may exit the context of the first virtual machine 110-1 and enter the context of the second virtual machine 110-2. The hypervisor 106 may stay within the context of the second virtual machine 110-2 for a time period ranging between 20-30 microseconds. This may allow the hypervisor 106, depending on the exit and entry latencies, to exit the context of the second virtual machine 110-2 and re-enter the context of the first virtual machine 110-1 before the 40 microsecond time period has passed. In one example, the hypervisor 106 may exit the context of the first virtual machine 110-1 and perform various hypervisor administrative functions while the virtual processor 108-1 is in the halt state. The hypervisor 106 can then re-enter the context of the first virtual machine 110-1 before the 40 microsecond time period has passed. Thus, the virtual processor 108-1 can be taken out of the halt state before the expected event arrives.

After the specific time period has passed, the hypervisor 106 can take the virtual processor 108-1 out of the virtual halt state. The virtual processor 108-1 is thus awakened in time for the expected event. The virtual processor 108-1 can then proceed as normal. This allows for more efficient used of computing resources.

Figure 2:
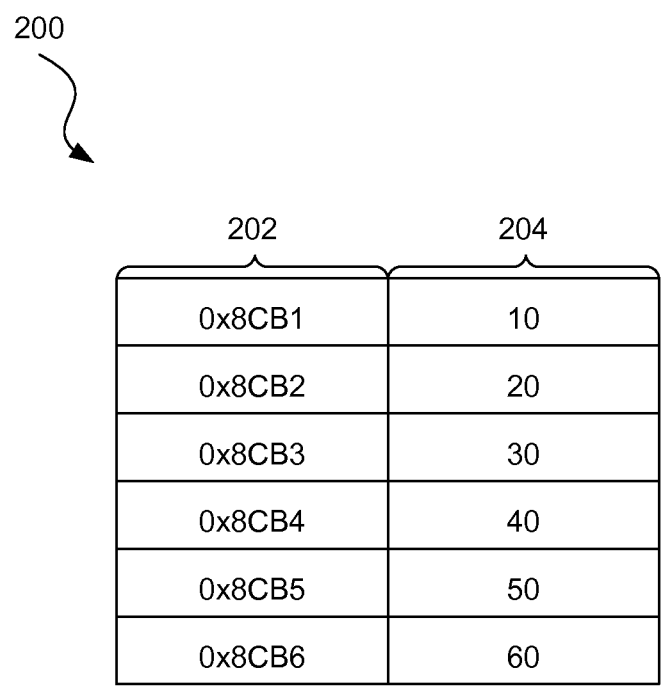
FIG. 2 is a diagram showing an illustrative memory table for defining sleep states, according to one example of principles described herein.

FIG. 2 is a diagram showing an illustrative memory table for defining sleep states. According to the present example, the table 200 may be provided to a virtual machine (e.g. 110, FIG. 1) when the virtual machine is first loaded onto the host machine (e.g. 102, FIG. 1). In this example, the table 200 relates memory addresses 202 to specific periods of time. The periods of time are represented by time values. A time value 204 may be 10 microseconds, 15, microseconds, 25 microseconds, etc. Thus, the virtual machine can determine the amount of time in which it expects to receive an event upon which it is waiting. The virtual machine can then access the memory address 202 associated with the appropriate time value 204.

For example, if the virtual machine determines that it can be in a halt state for 30 microseconds. The virtual machine may then access memory address 0x8CB3, which is the address associated with 30 microseconds in the table 204. In one example, the virtual machine can access the memory address 204 by changing the value stored within memory location 0x8CB3. Because the hypervisor monitors the memory addresses 204 within the table, the hypervisor knows that a memory address corresponding to a period of time 204 has been accessed. The hypervisor can then act accordingly.

While the present example illustrates each of the memory addresses 202 within the table 200 as contiguous memory addresses, other examples may have a table that has non-contiguous memory addresses. Additionally, while the present example illustrates the periods of time in increments of 10 microseconds, other examples may have different increments of time available for the virtual machine to select. For example, a table may include periods of time in increments of one microsecond, two microseconds, five microseconds, or twenty five microseconds.

The time values 204 specified in the table 200 may be used in a variety of different ways. In one example, the time values 204 may represent the amount of time in which the virtual machine expects to wait for an event. In such case, the hypervisor may determine the amount of time that the virtual processor should be in a sleep state. For example, if the virtual processor does not expect an event for about 50 microseconds, then the virtual processor may be taken out of the halt state in approximately 40 microseconds. This allows the virtual processor to account for any exit latency associated with taking the virtual processor out of the halt state. Additionally, the 10 microsecond window gives the virtual machine additional time to ensure that the virtual processor is back in an operating state by the time that the expected event arrives.

In one example, the time values 204 may represent the amount of time in which the virtual processor would like to be in a halt state. For example, the virtual machine may determine that the virtual processor does not expect an event for another 30 microseconds. The virtual machine may also determine that it would like a 20 microsecond window to ensure that it is out of the halt state well before the expected event arrives. Thus, the virtual machine may access memory address 0x8CB1, thereby informing the hypervisor that the virtual processor should be put into a halt state for 10 microseconds.

Figure 3:
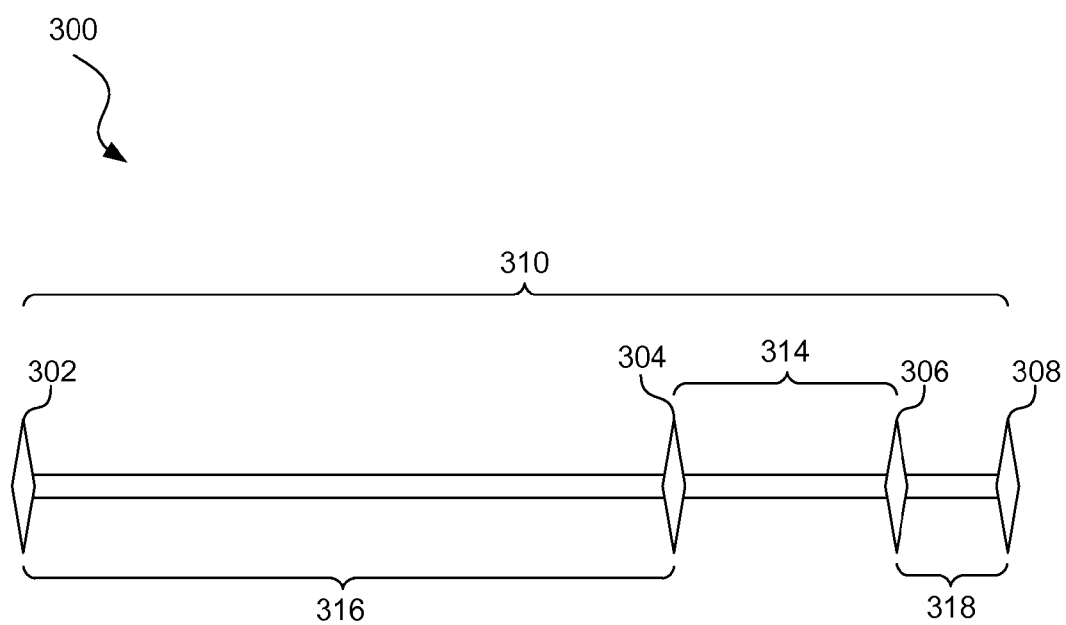
FIG. 3 is a diagram showing an illustrative timeline for entering and exiting a virtual processor sleep state, according to one example of principles described herein.

FIG. 3 is a diagram showing an illustrative timeline for entering and exiting a virtual processor sleep state. According to the present example, point 302 represents the time at which the virtual processor enters a halt state. Point 308 represents the time at which an event for which the virtual processor should be in an operating state is expected to occur.

As described above, the time values represented in the table may represent the time in which the virtual machine expects to wait for an event. For example, a time value may correspond to period 310. But, it is desirable for the virtual processor to exit the halt state before the expected event 308 occurs. In this example, the hypervisor 306 intends for the virtual processor to be back in an operating state by point 306, which allows a period of time 318 before the expected event 308 arrives. In some cases, however, there may be an exit latency associated with bringing the virtual processor out of the halt state. This exit latency is represented by period 314. The hypervisor may start bringing the virtual processor out of the halt state at point 304. Thus, if the virtual machine accesses a memory address or I/O address associated with a first period of time 310, the hypervisor may determine that it should put the virtual processor in a halt state for a second period of time 316, which is less than the first period of time, in order to ensure that the processor is back in an operating state before the expected event arrives 308.

In some examples, the time values represented in the table may represent the time in which the virtual processor should be in a sleep state. For example, the virtual machine itself may take into account the buffer period 318 and the exit latency period 314, and access a memory address or I/O address associated with a time value corresponding to time period 316. The hypervisor may then halt the virtual processor for the time associated with the appropriate time value. Because the virtual machine has already accounted for the additional time periods 314, 316, the hypervisor can simply halt the processor for the time value associated with the accessed memory address.

Figure 4:
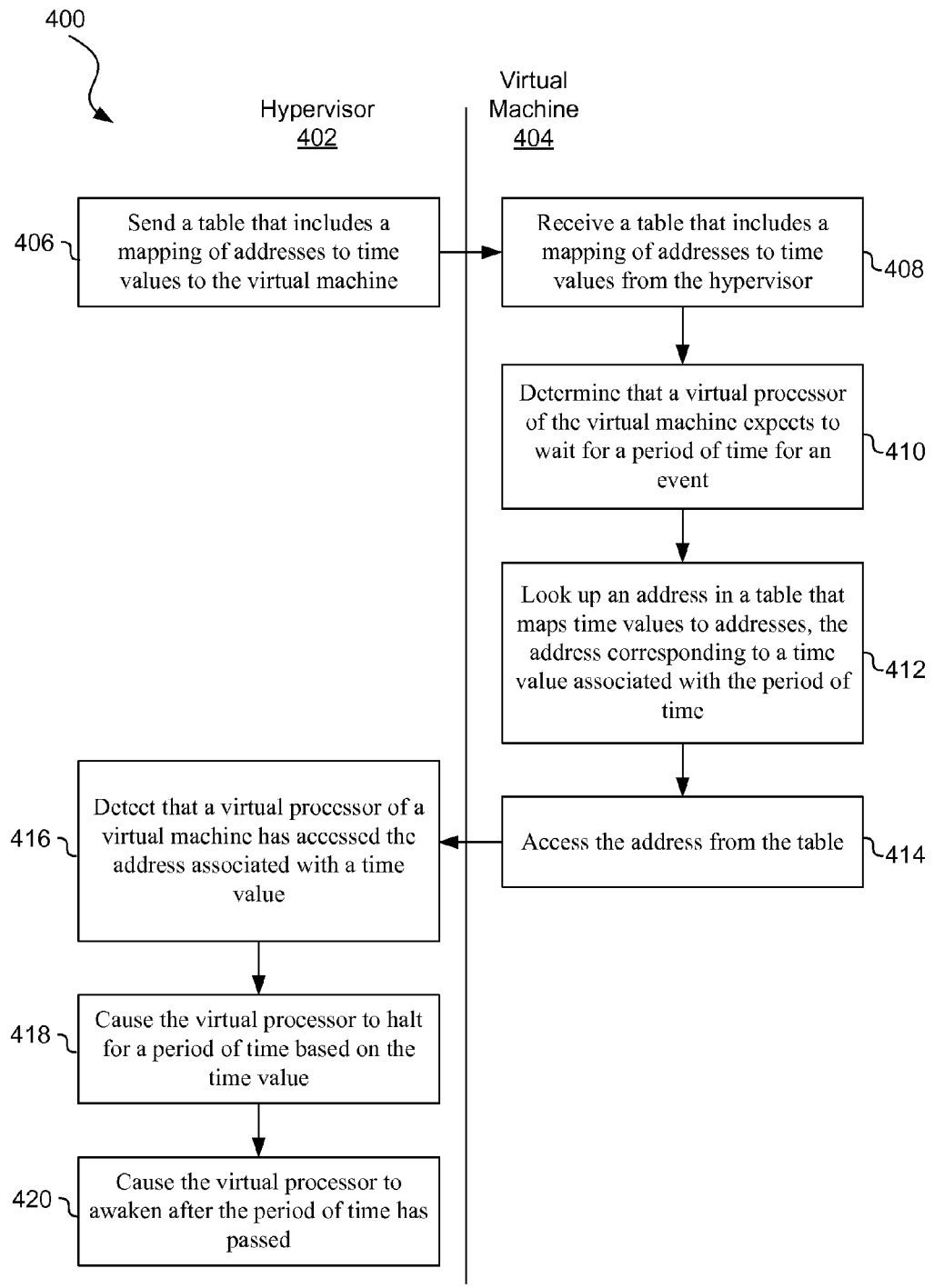
FIG. 4 is a flowchart showing an illustrative method for providing virtual processor sleep states, according to one example of principles described herein.

FIG. 4 is a flowchart showing an illustrative method 400 for providing virtual processor sleep states. The left side represents steps performed by a hypervisor 402. The right side represents steps performed by a virtual machine 404.

According to the present example, the method 400 includes a step 406 for, with the hypervisor 402, sending a table that includes a mapping of addresses to time values to the virtual machine 404. The addresses may be memory addresses or port addresses. The time values represent amounts of time for which a virtual processor is to be in a halt state. The method 400 further includes a step 408 for, with the virtual machine 404, receiving the table that includes the mapping of addresses to time values from the hypervisor 402. The transfer of the table between the hypervisor 402 and the virtual machine 404 may be done when the virtual machine 404 is first loaded onto the hypervisor 402. In some examples, the transfer may occur at a later point in time after the virtual machine 404 has been running on the system.

The method 400 further includes a step 410 for, with the virtual machine 404, determining that a virtual processor of the virtual machine expects to wait for a period time for an event. Computing systems often wait for various events. For example, a processor may send an instruction to a piece of hardware, and then wait for a response from that piece of hardware. Such hardware may include a network interface card. The processor may send an instruction to the network interface card to send some data over a network. The processor may then wait for a response from the network interface card. In one example, the virtual processor does not expect the event to occur for 83 microseconds.

The method 400 further includes a step 412 for, with the virtual machine 404, looking up an address in the table that maps time values to addresses, the address corresponding to a time value associated with the period of time. For example, if the period of time value is 83 microseconds, then the virtual machine 404 will look up that value in the table. In some cases, the table may not have the exact value corresponding to the expected period of time. Thus, the virtual machine 404 may look up the closest value. If the table has time values in increments of 10 microseconds, then the virtual machine 404 may determine the address associated with the time value of 80 microseconds. At step 414, the virtual machine 404 accesses the appropriate address from the table to inform the hypervisor that it wishes the virtual processor to be in a halt state for 80 microseconds.

At step 416, the hypervisor 402 detects that the virtual processor of the virtual machine 404 has accessed the address associated with the time value. The hypervisor may be using a MONITOR function associated with the X86 instruction set architecture. Thus, the hypervisor can determine that a STORE instruction has been applied to the appropriate address. The hypervisor can then respond accordingly.

At step 418, the hypervisor 402 causes the virtual process to halt for a period of time based on the time value. In this example, the hypervisor causes the virtual processor to halt for 80 microseconds. At step 420, after the 80 microseconds have passed, the hypervisor causes the virtual processor to awaken. The virtual processor can then proceed with normal execution.

Some examples of processing systems described herein may include non-transient, tangible, machine readable media that include executable code that when run by one or more processors (e.g., processor 104) may cause the one or more processors to perform the processes of method 400 as described above. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
    with a virtual machine, determining that a virtual processor of the virtual machine expects to wait for a first period of time for an event;
    with a hypervisor associated with the virtual machine, detecting that the virtual processor has accessed a designated address, the designated address being associated with a table that maps time values to addresses;
    causing the virtual processor to enter a halt state for a second period of time; and
    causing the virtual processor to exit the halt state after the second period of time has passed, the second period of time being based on the time value.

2. The method of claim 1, wherein the designated memory address is associated with a table, each entry within the table corresponding to a different time value.

3. The method of claim 1, wherein the first period of time is based on an expectation of a period of time to wait for an event for which the virtual processor should not be in a sleep state.

4. The method of claim 1, further comprising, before changing the sleep state, determining that there are no pending events for the virtual processor other than the expected event.

5. The method of claim 1, wherein the designated memory address comprises an Input/Output (I/O) address.

6. The method of claim 1, wherein the designated address comprises a memory address.

7. The method of claim 1, further comprising, with the hypervisor, while the virtual processor is halted, performing one of the following: remain in a hypervisor mode or execute instructions for a different virtual processor for a different virtual machine.

8. The method of claim 2, wherein the different time values correspond to incremental periods of times.

9. The method of claim 2, wherein the incremental values are 10 microseconds apart.

10. The method of claim 3, wherein the period of time accounts for an exit latency for exiting a halted state.

11. The method of claim 10, wherein a pending event comprises a pending interrupt request.

12. The method of claim 1, further comprising, with the hypervisor, providing the virtual machine with a mapping of time values and addresses.

13. A method comprising:
    with a virtual machine, determining that a virtual processor of the virtual machine expects to wait for a first period of time for an event;
    looking up an address in a table that maps time values to addresses, the address corresponding to a time value associated with the first period of time;

accessing the address from the table; and with the virtual processor, entering a halt state for a second period of time in response to a command from a hypervisor, the second period of time being associated with the time value, the hypervisor running the virtual machine.

14. The method of claim 13, further comprising, exiting the halted state after the second period of time.

15. The method of claim 13, further comprising, with the virtual machine, receiving the table from the hypervisor after being loaded onto the hypervisor.

16. The method of claim 13, further comprising:

with the virtual machine, receiving an exit latency from the hypervisor, the exit latency indicating a latency for exiting the halt state; and accounting for the exit latency when looking up the time value associated with the first period of time.

17. A computing system comprising:

a processor; and a memory comprising computer readable instructions that when executed by the processor, cause the system to run a hypervisor to host a virtual machine;

detect that a virtual processor of the virtual machine has accessed a designated address, the designated address being associated with a time value;

halt the virtual processor for a period of time; and continue execution of the virtual processor after a period of time has passed, the period of time being based on the time value.

18. The system of claim 17, wherein the designated memory address is associated with a table, each entry within the table corresponding to a different time value and wherein the period of time selected based on the accessed, designated address is based on an expectation of a period of time to wait for an event for which the virtual processor should not be in a sleep state.

19. The system of claim 17, wherein the processor is further to cause the system to perform, while the virtual processor is halted, one of the following: remain in a hypervisor mode or execute instructions for a different virtual processor for a different virtual machine.

20. The system of claim 17, wherein the processor is further to cause the system to, before changing the sleep state, determine that there are no pending events for the virtual processor.

* * * * *